(12) United States Patent
Xu et al.

(10) Patent No.: US 10,924,643 B2
(45) Date of Patent: Feb. 16, 2021

(54) TERMINAL WITH CONTROLLED ELASTIC CAMERA COMPONENT

(71) Applicants: K-Tronics (Suzhou) Technology Co., Ltd., Jiangsu (CN); BOE Technology Group Co., Ltd., Beijing (CN)

(72) Inventors: Aiming Xu, Beijing (CN); Wei Huang, Beijing (CN)

(73) Assignees: K-Tronics (Suzhou) Technology Co., Ltd., Jiangsu (CN); BOE Technology Group Co., Ltd., Beijing (CN)

( * ) Notice: Subject to any disclaimer, the term of this patent is extended or adjusted under 35 U.S.C. 154(b) by 73 days.

(21) Appl. No.: 16/255,957

(22) Filed: Jan. 24, 2019

(65) Prior Publication Data
US 2019/0373141 A1 Dec. 5, 2019

(30) Foreign Application Priority Data
May 31, 2018 (CN) .......................... 2018 1 0551033

(51) Int. Cl.
H04N 5/225 (2006.01)
H04M 1/02 (2006.01)
H04N 5/232 (2006.01)

(52) U.S. Cl.
CPC ........ *H04N 5/2252* (2013.01); *H04M 1/0264* (2013.01); *H04M 1/0266* (2013.01); *H04N 5/23219* (2013.01)

(58) Field of Classification Search
None
See application file for complete search history.

(56) References Cited

U.S. PATENT DOCUMENTS 5,880,928 A * 3/1999 Ma .................. G06F 1/1616
                                                361/679.23
8,224,179 B2 * 7/2012 Lin .................. G03B 17/02
                                                348/376

(Continued)

FOREIGN PATENT DOCUMENTS

CN    103533225 A    1/2014
CN    104023190 A    9/2014

(Continued)

OTHER PUBLICATIONS

First office action of Chinese application No. 201810551033.3 dated Jan. 7, 2020.

*Primary Examiner* — Cynthia Segura
(74) *Attorney, Agent, or Firm* — Fay Sharpe LLP

(57) ABSTRACT

Provided is a terminal. The terminal includes a camera component and a camera control device. The terminal has an accommodation chamber therein. Both of the camera component and the camera control device are located in the accommodation chamber. The camera control device comprises a switch valve component, an elastic component and a holding component. When held by the holding component, a valve core of the switch valve component could limit the camera component to be within the accommodation chamber. When camera control software such as a camera application is infected by virus, the camera component could avoid stretching out of the accommodation chamber even upon being controlled to start. Accordingly, the camera component could avoid being secretly filmed by lawbreakers and prevent user's privacy from being exposed.

19 Claims, 12 Drawing Sheets

(56) References Cited

U.S. PATENT DOCUMENTS

| | | | | |
|---|---|---|---|---|
| 9,692,953 | B2* | 6/2017 | Xiong | G03B 11/043 |
| 9,736,383 | B2* | 8/2017 | Evans, V | H04N 5/2254 |
| 9,998,642 | B2* | 6/2018 | Evans, V | H04N 5/2252 |
| 10,070,030 | B2* | 9/2018 | Evans, V | H04N 5/2253 |
| 10,389,927 | B2* | 8/2019 | Zhang | G03B 29/00 |
| 10,444,802 | B2* | 10/2019 | Zeng | H04N 5/2253 |
| 10,571,959 | B2* | 2/2020 | Liao | G06F 1/1658 |
| 2004/0076420 | A1 | 4/2004 | Orimoto | |
| 2005/0014527 | A1* | 1/2005 | Chambers | H04N 5/2256 |
| | | | | 455/556.1 |
| 2016/0191760 | A1* | 6/2016 | Wu | H04N 5/2257 |
| | | | | 348/262 |
| 2016/0266418 | A1 | 9/2016 | Huang | |
| 2017/0064166 | A1* | 3/2017 | Xiong | H04M 1/0264 |
| 2017/0299408 | A1* | 10/2017 | Kang | G01D 5/2046 |
| 2018/0262663 | A1* | 9/2018 | Zhang | H04N 5/2257 |
| 2019/0305403 | A1* | 10/2019 | Wang | H01Q 21/10 |
| 2020/0020471 | A1* | 1/2020 | Luo | H01F 7/16 |

FOREIGN PATENT DOCUMENTS

| | | |
|---|---|---|
| CN | 105141815 A | 12/2015 |
| CN | 207304649 U | 5/2018 |

\* cited by examiner

TERMINAL WITH CONTROLLED ELASTIC CAMERA COMPONENT

CROSS-REFERENCE TO RELATED APPLICATIONS

This application claims priority to Chinese Patent Application No. 201810551033.3, filed on May 31, 2018 and entitled "TERMINAL", the entire contents of which are incorporated herein by reference.

TECHNICAL FIELD

The present disclosure relates to the field of terminal technology and in particular to a terminal.

BACKGROUND

With the development of science and technology, an electronic product is equipped with more and more functional devices to meet various requirements of users. For example, terminals such as mobile phones and tablet PCs are generally equipped with cameras to satisfy the photographing requirements of users.

SUMMARY

The present disclosure provides a terminal, comprising a camera component and a camera control device, wherein the terminal has an accommodation chamber therein, an opening of the accommodation chamber is located at a side wall of the terminal, and both of the camera component and the camera control device are located in the accommodation chamber; the camera control device comprises a switch valve component, an elastic component and a holding component; the elastic component is connected to the camera component and located on the side, away from the opening of the accommodation chamber, of the camera component; the holding component is connected to the camera component and configured to hold the switch valve component; and the camera component is located in the accommodation chamber when the switch valve component is held by the holding component, and the elastic component drives the camera component to stretch out from the opening of the accommodation chamber when the switch valve component is separated from the holding component.

In some embodiments, the switch valve component comprises a valve body and a valve core movably connected to the valve body; and the holding component is configured to hold the valve core.

In some embodiments, the valve core is located in the valve body and is capable of stretching out of and retracting into the valve body, and stretching directions of the valve core and the elastic component intersect; the valve core is held by the holding component when stretching out of the valve body, applying a pressure to the elastic component along the stretching direction of the elastic component, such that the camera component is located in the accommodation chamber; and the valve core is separated from the holding component when retracting into the valve body, and the elastic component drives the camera component to stretch out of the accommodation chamber.

In some embodiments, the valve core is further configured, after the elastic component drives the camera component to stretch out of the accommodation chamber and stops driving the camera component to move, to stretch out of the valve body.

In some embodiments, the switch valve component is a mechanical valve of which a valve core is configured to retract into a valve body of the mechanical valve under the action of an external force.

In some embodiments, the switch valve component is a solenoid valve of which a valve core is configured to retract into a valve body of the solenoid valve when a solenoid valve opening signal is received.

In some embodiments, the terminal further comprises an identity recognition module and a control module, wherein the solenoid valve, the control module and the identity recognition module are electrically connected in sequence; the identity recognition module is configured to verify acquired identity information and to input a success signal to the control module when the identity information is authenticated; and the control module is configured to input the solenoid valve opening signal to the solenoid valve when receiving the success signal.

In some embodiments, the switch valve component comprises a mechanical valve and a solenoid valve, valve cores of the mechanical valve and the solenoid valve are sleeve connected, and valve bodies of the mechanical valve and the solenoid valve are also sleeve connected.

In some embodiments, the stretching direction of the valve core is perpendicular to that of the elastic component.

In some embodiments, the holding component comprises a fixture block and at least one first spring, and stretching directions of each first spring and the elastic component intersect; and one end of each first spring is connected to the camera component, the other end thereof is connected to the fixture block, and an end face close to the opening of the accommodation chamber, of the fixture block is configured to hold the valve core.

In some embodiments, a face, away from the at least one first spring, of the fixture block is a slope, and a thickness of the fixture block in the stretching direction of the at least one first spring is gradually reduced along a direction away from the opening of the accommodation chamber.

In some embodiments, the fixture block has a triangular longitudinal section that is parallel to the stretching directions of the elastic component and the at least one first spring.

In some embodiments, the stretching direction of each first spring is perpendicular to that of the elastic component.

In some embodiments, one end of each first spring is embedded into a cavity of the camera component.

In some embodiments, a length of the holding component is greater than a width of the opening of the accommodation chamber, and a length direction of the holding component and a width direction of the opening are parallel to the stretching direction of the first spring.

In some embodiments, the elastic component comprises at least one second spring; and one end of each second spring is connected to the camera component, and the other end thereof is connected to the bottom of the accommodation chamber.

In some embodiments, the accommodation chamber comprises a first chamber and a second chamber communicated with the first chamber, an opening of the second chamber is located at a side wall of the first chamber, and an opening of the first chamber is the opening of the accommodation chamber; both of the elastic component and the holding component are located in the first chamber, and the switch valve component is located in the second chamber; and the camera component is located in the first chamber when the valve core is held by the holding component, and the elastic component drives the camera component to stretch out from the opening of the first chamber when the valve core is separated from the holding component.

In some embodiments, a slide rail is located on a side wall of the first chamber, a bulged structure adapted to the slide rail is located on the camera component, and the camera component drives the bulged structure to slide in the slide rail when the camera component stretches and retracts in the accommodation chamber.

In some embodiments, an extending direction of the slide rail is parallel to the stretching direction of the elastic component.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

001—finger;
10—camera component;
101—camera fixing part;
102—camera module;
20—camera control device;
201—switch valve component;
2011—valve body;
2012—valve core;
201a—mechanical valve;
201a1—valve body of the mechanical valve;
201a2—valve core of the mechanical valve;
201a3—connecting piece of the mechanical valve;
201b—solenoid valve;
201b1—valve body of the solenoid valve;
201b2—valve core of the solenoid valve;
202—elastic component;
203—holding component;
2031—fixture block;
2032—first spring;
24—second elastic component;
241—second spring 241;
30—accommodation chamber;
301—opening;
302—first chamber;
303—second chamber;
40—side wall;
L—rotating shaft;
50—fingerprint recognition module;
60—prompt interface.

DETAILED DESCRIPTION

The embodiments of the present disclosure will be described in further detail by combining the accompanying drawings, to present the principles and advantages of the present disclosure more clearly.

Currently, cameras are usually mounted at the back of a terminal or at the top of the screen and are exposed to users. Users can start up the camera to take pictures through such control software as a camera application. Since the camera is exposed to users and the start of the camera is controlled by a software, there would be a risk that the software is infected by virus during the interaction of the terminal with other electronic equipment. As such, the start of the camera is very likely to be controlled when the control software gets infected by virus, and once being controlled, the camera would be utilized by lawbreakers to film illegally, leading to the exposure of the user's privacy.

Figure 1:
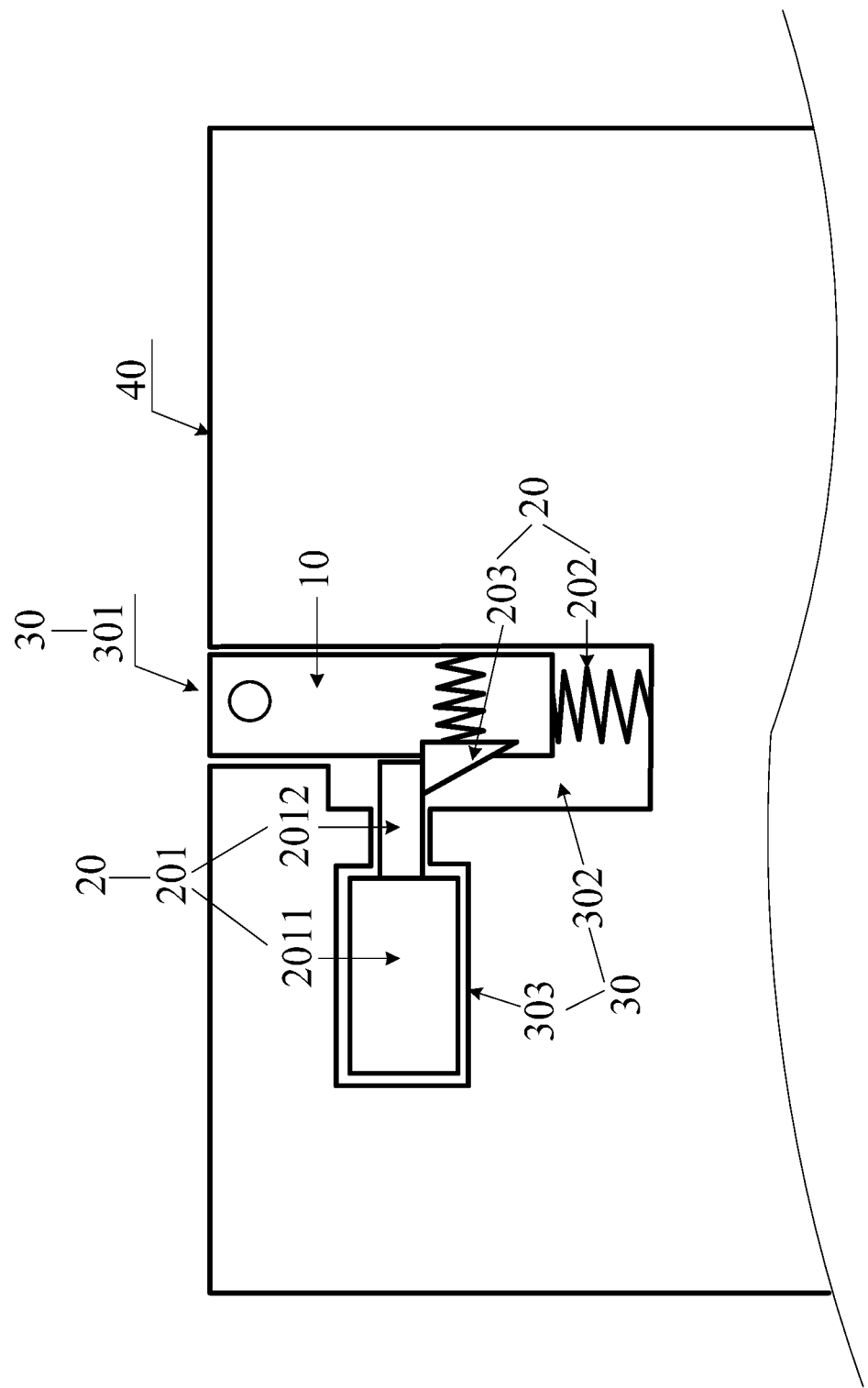
FIG. 1 is a structural schematic view of a terminal according to an embodiment of the present disclosure.

FIG. 1 illustrates a structural schematic view of a terminal according to one embodiment of the present disclosure. The terminal may be an equipment with a photographing function, such as a mobile phone and a tablet PC. As shown in FIG. 1, the terminal may include a camera component 10 and a camera control device 20.

The terminal has an accommodation chamber 30 therein. An opening 301 of the accommodation chamber 30 is located at a side wall 40 of the terminal. Both the camera component 10 and the camera control device 20 are located inside the accommodation chamber 30.

The camera control device 20 may include a switch valve component 201, an elastic component 202 and a holding component 203. Exemplarily, the accommodation chamber 30 may include a first chamber 302 and a second chamber 303 communicated with the first chamber 302. An opening of the second chamber 303 is located at a side wall of the first chamber 302. An opening of the first chamber 302 is the opening 301 of the accommodation chamber 30. All of the camera component 10, the elastic component 202 and the holding component 203 may be located inside the first chamber 302. The switch valve component 201 may be located inside the second chamber 303. It should be noted that the embodiment of the present disclosure takes that the accommodation chamber 30 includes a first chamber 302 and a second chamber 303 as an example for schematic explanation, and in another optional implementation form, the accommodation chamber 30 may only include one chamber.

Referring to FIG. 1, the elastic component 202 is connected to the camera component 10 from the side, away from the opening 301 of the accommodation chamber 30, of the camera component 10. The holding component 203 is connected to the camera component 10 and configured to hold a valve core 2012.

The camera component 10 is located inside the accommodation chamber 30 (specifically, inside the first chamber 302) when the switch valve component 201 is held by the holding component 203. Yet when the switch valve component 201 is separated from the holding component 203, the elastic component 202 drives the camera component 10 to stretch out from the opening 301 (namely, the opening of the first chamber 302) of the accommodation chamber 30.

In an embodiment of the present disclosure, after the switch valve component 201 is held by the holding component 203, a distance between the retaining position and the opening 301 is greater than or equal to a distance between the retaining position and an end face, close to the opening 301, of the camera component 10. This guarantees that the camera component 10 is located inside the accommodation chamber 30 after the valve core 2012 is held by the holding component 203. The sum of lengths of the elastic component 202 and the camera component 10 is greater than a depth of the first chamber 302 when the holding component 203 does not hold the valve core 2012. This guarantees that the camera component 10 could stretch out from the opening 301 of the accommodation chamber 30 after the switch valve component 201 is separated from the holding component 203. Length directions of the elastic component 202 and the camera component 10 and a depth direction of the first chamber 302 are all parallel to a stretching direction of the elastic component 202.

In the embodiment of the present disclosure, the holding component 203 is connected to the camera component 10 and the elastic component 202 is connected to the camera component 10 from the side, away from the opening 301 of the accommodation chamber 30, of the camera component 10. As such, when held by the holding component 203, the valve core 2012 in the switch valve component 201 would apply a pressure to the elastic component 202 through the holding component 203 and the camera component 10. The direction of the pressure is the same as the stretching direction of the elastic component 202, such that the elastic component 202 being compressed. Accordingly, the camera component 10 could be limited to be within the accommodation chamber 30. When the valve core 2012 in the switch valve component 201 is separated from the holding component 203, the pressure applied to the elastic component 202 by the valve core 2012 would be removed, such that the elastic component 202 could drive the camera component 10 to stretch out from the opening 301 of the accommodation chamber 30.

In this arrangement, when the camera component 10 is not needed, the valve core 2012 in the switch valve component 201 could be controlled to be held by the holding component 203, and the switch valve component 201 could limit the camera component 10 to be within the accommodation chamber 30. As such, when camera control software such as a camera application gets infected by virus, the camera component 10 could not stretch out from the opening 301 of accommodation chamber 30 even upon being controlled to start. Accordingly, the camera component could avoid being secretly filmed by lawbreakers and prevent user's privacy from being exposed. When the camera component is needed for taking a photograph, the valve core 2012 in the switch valve component 201 could be controlled to be separated from the holding component 203, such that the pressure applied to the elastic component 202 by the valve core 2012 would be removed. The elastic component 202 may drive the camera component 10 to stretch out from the opening of the accommodation chamber 30 and the camera component 10 could be used as normal to take a photograph.

In summary, according to the terminal provided by the embodiment of the present disclosure, when held by the holding component, the valve core in the switch valve component could limit the camera component to be within the accommodation chamber of the terminal. When camera control software such as a camera application gets infected by virus, the camera component would not stretch out from the opening of the accommodation chamber even upon being controlled to start. Accordingly, the camera component could avoid being secretly filmed by lawbreakers and prevent user's privacy from being exposed. When the camera component is required for taking a photograph, the valve core of the switch valve component could be controlled to be separated from the holding component, such that the pressure applied to the elastic component by the valve core would be removed. The elastic component may drive the camera component to stretch out from the opening of the accommodation chamber and the camera component could be used as normal to take a photograph.

Figure 2:
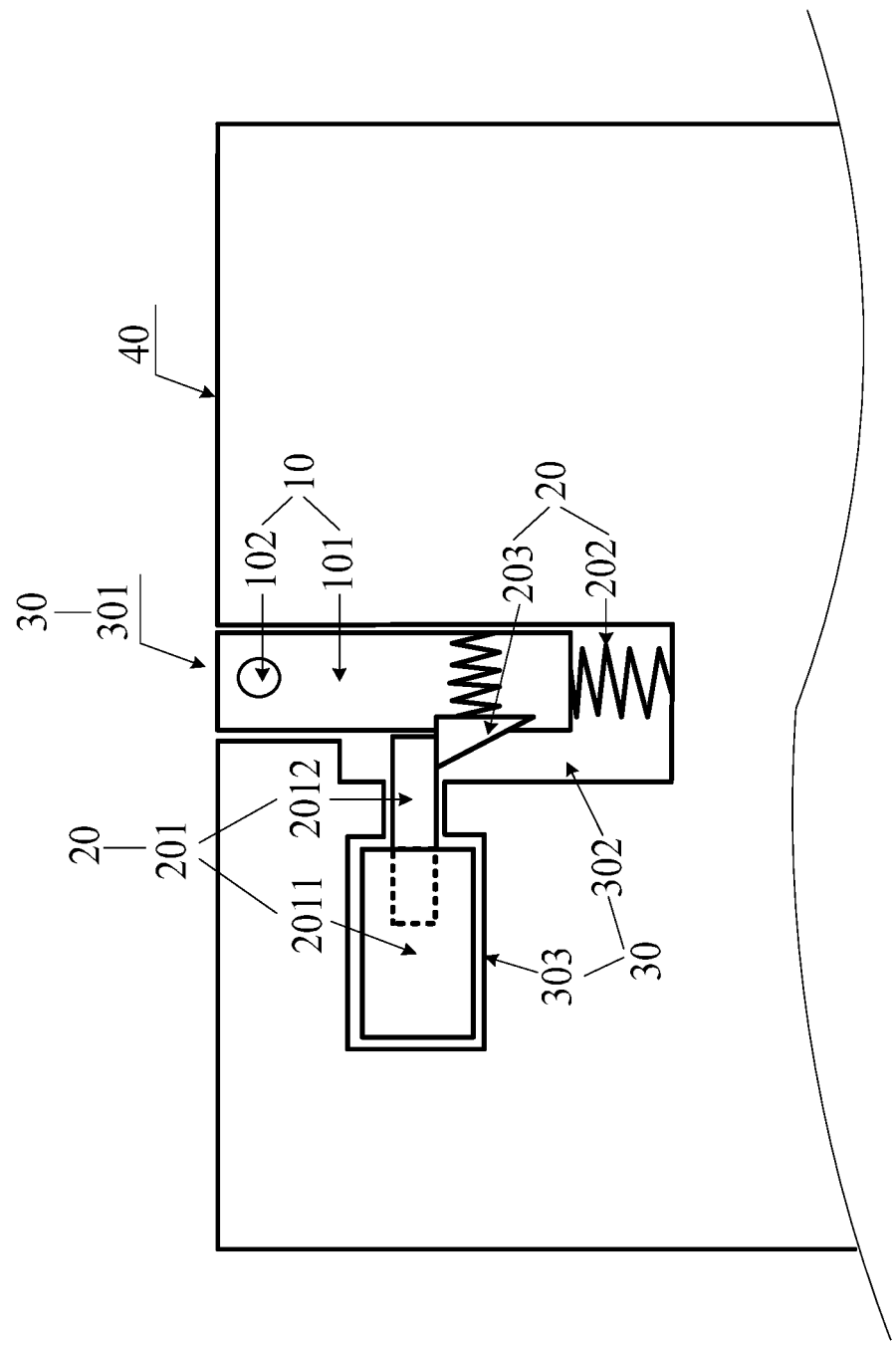
FIG. 2 is a structural schematic view of another terminal according to an embodiment of the present disclosure.

FIG. 2 illustrates a structural schematic view of another terminal according to one embodiment of the present disclosure. In the embodiment of the present disclosure, as shown in FIG. 2, the camera component 10 may include a camera fixing part 101 and at least one camera module 102. A cavity configured to receive the at least one camera module 102 may be provided in the camera fixing part 101. The at least one camera module 102 may include a front camera module and a rear camera module which are located back to back in the camera fixing part 101.

It should be noted that the camera component 10 also may be electrically connected to the terminal. Exemplarily, each camera module 102 in the camera component 10 may be electrically connected to a module in the terminal, which controls the camera component 10 to start or stop, through a flat cable. The flat cable may pass through a channel of the accommodation chamber 30, leading to the interior of the terminal, to be electrically connected to the terminal. The flat cable may have a redundant length, which guarantees the electrical connection between the camera component 10 and the terminal when the camera component 10 stretches and retracts. The module that controls the camera component 10 to start or stop may be integrated on a mainboard or other control modules of the terminal.

It should also be noted that each camera module 102 in the camera component 10 is located outside the accommodation chamber 30 after the camera component 10 stretches out from the opening 301 of the accommodation chamber 30.

Further, a slide rail (not shown in FIG. 2) may be located on the side wall of the first chamber 302 of the accommodation chamber 30. An extending direction of the slide rail may be parallel to the stretching direction of the elastic component 202. Optionally, the extending direction of the slide rail may intersect the stretching direction of the elastic component 202, and an angle therebetween is relatively small, for example, may be less than 5°. Correspondingly, a bulged structure (also not shown in FIG. 2) adapted to the slide rail may be located on the camera component 10. In the embodiment of the present disclosure, the bulged structure may slide along the slide rail when the camera component 10 stretches and retracts in the accommodation chamber 30, such that the camera component 10 may move along the extending direction of the slide rail. In this way, the motion path of the camera component 10 could be accurately controlled and the stability of the camera component 10 upon stretching and retracting could be improved. Exemplarily, the bulged structure on the camera component 10 may be a slider adherent to the camera fixing part 101, and may also be a protruding portion provided on the camera fixing part 101.

In the embodiment of the present disclosure, the switch valve component 201 may include a valve body 2011 and the valve core 2012 movably connected to the valve body 2011. The holding component 203 is configured to hold the valve core 2012. The valve body 2011 and the valve core 2012 could be connected in various ways. The embodiment of the present disclosure takes the following two implementation forms as examples for schematic explanation.

In a first optional implementation form, as shown in FIG. 2, the valve core 2012 in the switch valve component 201 is located in the valve body 2011 and could stretch out of or retract into the valve body 2011. The stretching direction of the valve core 2012 may intersect that of the elastic component 202. For example, the stretching direction of the valve core 2012 may be perpendicular to that of the elastic component 202. Through the stretching and retracting in the valve body 2011, the valve core 2012 could be held by or separated from the holding component 203. For example, the valve core 2012 could be withheld by the holding component 203 when stretching out of the valve body 2011, and separated from the holding component 203 when retracting into the valve body 2011.

Figure 3:
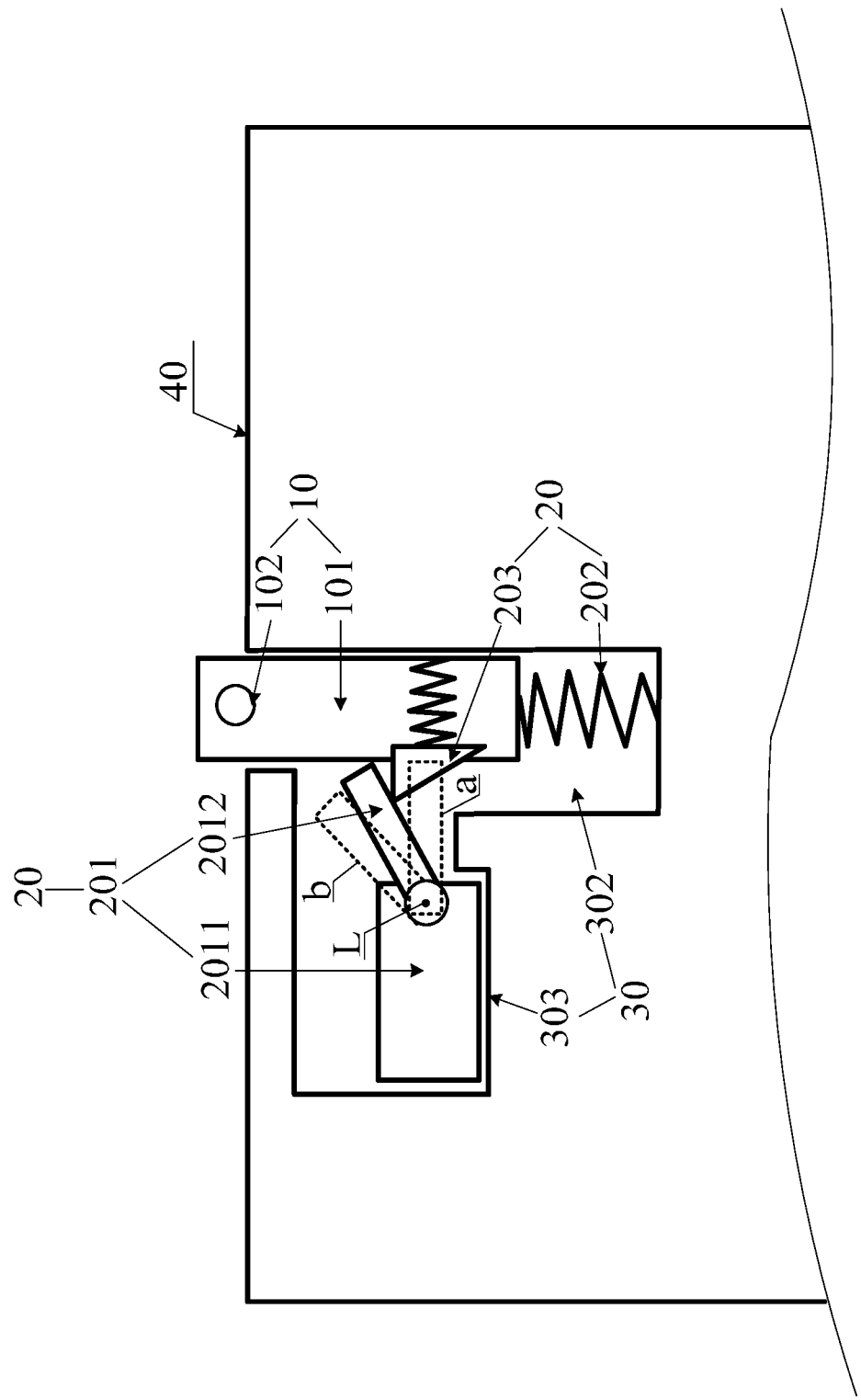
FIG. 3 is a structural schematic view of yet another terminal according to one embodiment of the present disclosure.

In a second optional implementation form, as shown in FIG. 3, which is a structural schematic view of another terminal according to one embodiment of the present disclosure, one end of the valve core 2012 is rotationally connected with the valve body 2011 through a rotating shaft L. The valve body 2011 could drive the valve core 2012 to rotate around the rotating shaft L. Through the rotation of the valve core 2012 driven by the valve body 2011, the valve core 2012 could be held by or separated from the holding component. For example, driven by the valve body 2011, the valve core 2012 could move to position a in FIG. 3 and thus be held by the holding component 203; and the valve core 2012 could also move to position b in FIG. 3 and thus be separated from the holding component.

In the embodiment of the present disclosure, after the camera component 10 stretches out of the accommodation chamber 30 and finishes photographing, a user usually needs to press the camera component 10 to control it to retract into the accommodation chamber. To guarantee that the valve core 2012 could be quickly held by the holding component 203 after the camera component 10 retracts into the accommodation chamber 30, after the elastic component 202 drives the camera component 10 to stretch out of the accommodation chamber 30 and stops driving the camera component 10 to move (that is, after the camera component 10 completely stretches out of the accommodation chamber 30), the valve core 2012 could be controlled to move in a direction approaching the holding component 203. At this time, there is no need to control the status of the valve core 2012 after the user presses and controls the camera component 10 to retract into the accommodation chamber 30. The valve core 2012 could be automatically held by the holding component.

Exemplarily, for the first optional implementation form, the valve core 2012 is also configured, after the elastic component 202 drives the camera component 10 to stretch out of the accommodation chamber 30 and stops driving the camera component 10 to move, to stretch out of the valve body 2011. For example, an elastic element may be located at the end, in contact with the valve body 2011, of the valve core 2012. The valve core 2012 could stretch out of the valve body 2011 under the action of elastic force of the elastic element, after the camera component 10 stretches out of the accommodation chamber 30. For the second optional implementation form, after the elastic component 202 drives the camera component 10 to stretch out of the accommodation chamber 30 and stops driving the camera component 10 to move, the valve body 2011 needs to drive the valve core 2012 for a second time to rotate in the direction approaching the holding component 203, for example, to rotate toward the position a shown in FIG. 3.

It should be noted that the following embodiments take the connection mode between the valve body 2011 and the valve core 2012 in the first optional implementation form as an example for schematic explanation.

In the embodiments of the present disclosure, the holding component 203 may have various structures. The embodiments of the present disclosure take the following two exemplary implementation forms as examples for schematic explanation.

Figure 4:
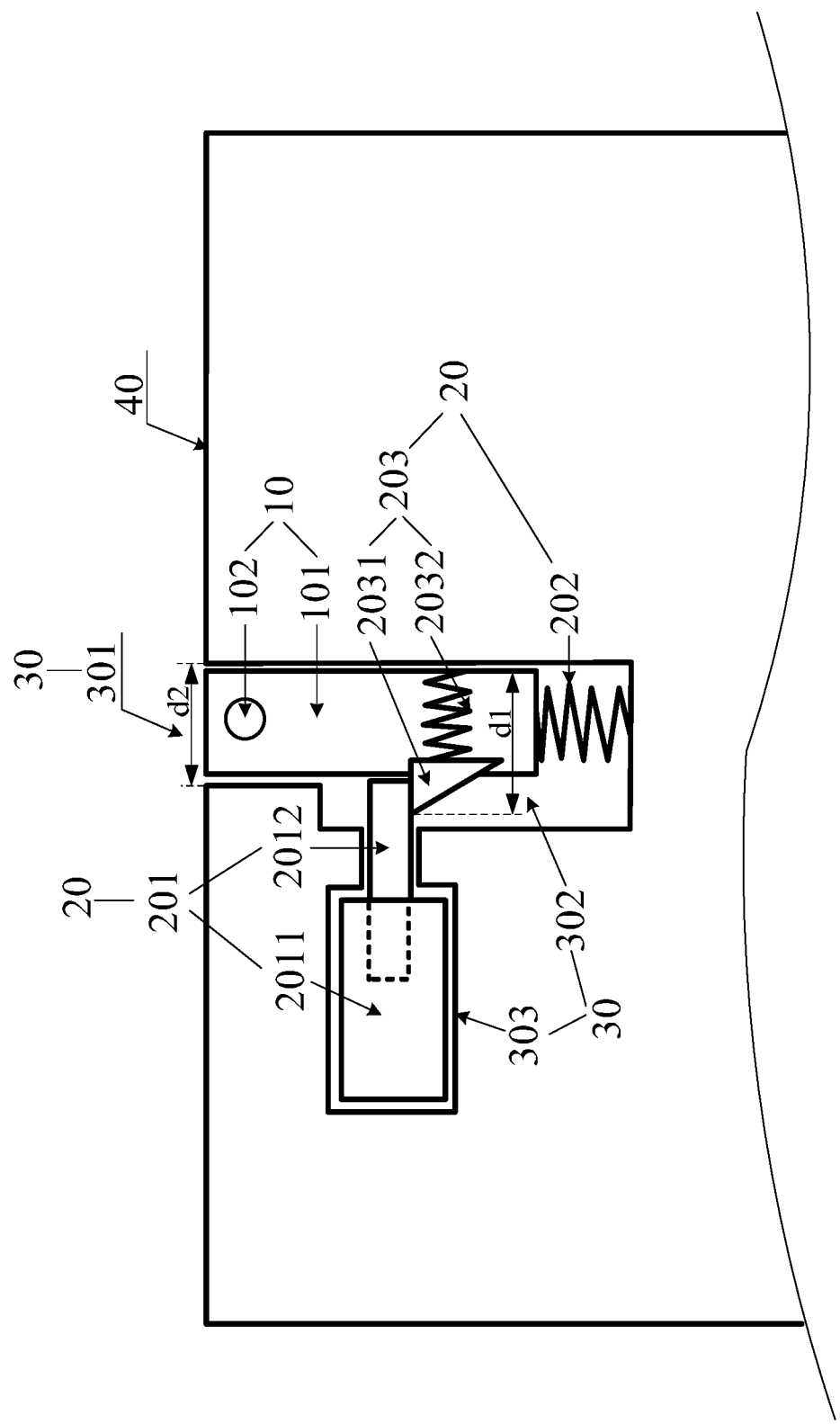
FIG. 4 is a schematic diagram of a structure of another terminal according to another embodiment of the present disclosure.

In a first schematic implementation form, as shown in FIG. 4, which is a structural schematic view of yet another terminal according to the present disclosure, the holding component 203 may include a fixture block 2031 and at least one first spring 2032. FIG. 4 merely exemplarily illustrates that a second elastic component 24 includes one second spring 241. A stretching direction of each first spring 2032 intersects that of the elastic component 202. Exemplarily, the stretching direction of each first spring 2032 is perpendicular to that of the elastic component 202. One end of each first spring 2032 is connected to the camera component 10, and the other end thereof is connected to the fixture block 2031. An end face of the end close to the opening 301 of the accommodation chamber 30, of the fixture block 2031 is configured to hold the valve core 2012 in the switch valve component 202.

Exemplarily, a cavity configured to receive the first spring 2032 is further provided in the camera fixing part 101 of the camera component 10. One end of each first spring 2032 may be embedded into the cavity of the camera component 10. The first spring 2032 could stretch and retract in the cavity of the camera component 10. The fixture block 2031 connected to the other end of the first spring 2032 only moves in the stretching direction of the first spring 2032 under the action of the cavity of the camera component 10, which prevents the fixture block 2031 from moving in other directions. Thus, the stability of the lock between fixture block 2031 and the valve core 2012 is effectively improved.

In the embodiment of the present disclosure, when the holding component 203 includes a plurality of first springs 2032, these springs 2032 may be located in parallel. That is, stretching directions of all the first springs 2032 are parallel. At this time, by connecting the plurality of first springs 2023 to the fixture block 2031, the stability of the fixture block 2031 during movement is effectively improved.

Optionally, a face, away from the at least one first spring 2032, of the fixture block 2031 is a slope. A thickness of the fixture block 2031 in the stretching direction of the at least one first spring 2032 is gradually reduced in a direction away from the opening 301 of the accommodation chamber 30. Exemplarily, the fixture block 2031 has a triangular longitudinal section, and the section is parallel to the stretching directions of the elastic component 202 and the at least one first spring 2032.

Figure 5:
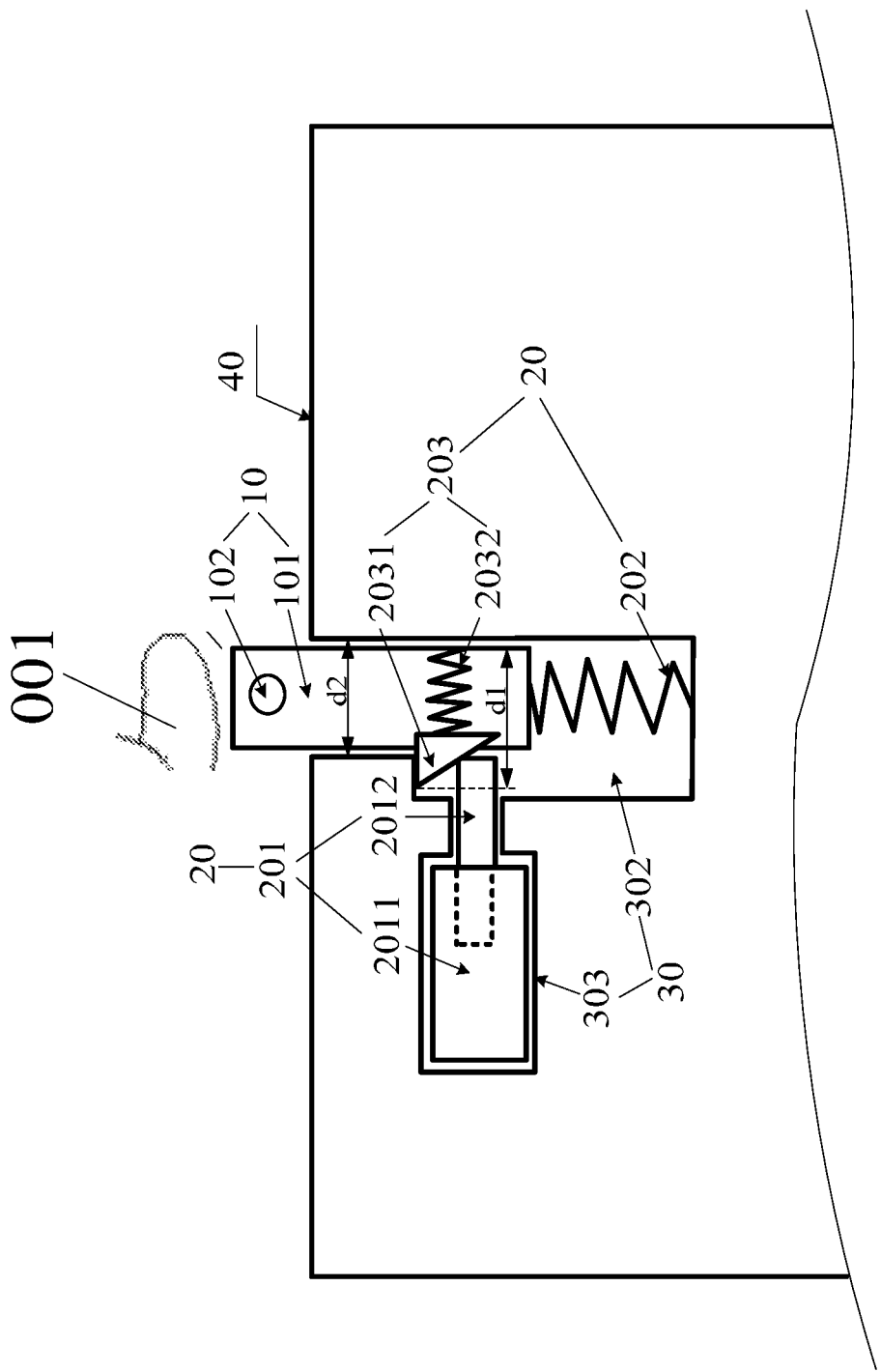
FIG. 5 is an effect view showing that the camera component in the terminal illustrated by FIG. 4 stretches out of the accommodation chamber.

FIG. 5 is an effect view showing that the camera component in the terminal illustrated by FIG. 4 stretches out of the accommodation chamber. As shown in FIG. 5, the valve core 2012 would stretch out of the valve body 2011 under the action of the elastic force of the elastic element after the camera component 10 stretches out of the accommodation chamber 30. The camera component 10 could move in a compression direction of the elastic component 202 when the user presses the camera component 10 with a finger 001. During the movement of the camera component 10, the fixture block 2031 moves therewith in the direction approaching the elastic component 202. The slope on the side, close to the valve core 2012, of the fixture block 2031 abuts against the valve core 2012. At this time, with the movement of the fixture block 2031, each first spring 2032 is gradually compressed under the abutting action of the valve core 2012. After the slope of the fixture block 2031 no longer abuts against the valve core 2012, each first spring 2032 could be released. An end face of the end, close to the opening of the accommodation chamber 30, of the fixture block 2031 holds valve core 2012. Thus, the camera component 10 could be limited to be within the accommodation chamber 30.

Optionally, as shown in FIG. 4 and FIG. 5, a length d1 of the holding component 203 is greater than a width d2 of the opening 301 of the accommodation chamber 30. The length direction of the holding component 203 and a width direction of the opening 301 of the accommodation chamber 30 are parallel to the stretching direction of the first spring 2032. The length d1 of the holding component 203 may be the sum of lengths of the fixture block 2031 and the first spring 2032. At this time, since the holding component 203 is located in the accommodation chamber, and the length d1 of the holding component 203 is greater than the width d2 of the opening of the accommodation chamber 30, the side wall of the first cavity 302 in the accommodation chamber 30 is held by the fixture block 2031 after the camera component 10 stretches out of the accommodation chamber 30, effectively preventing the camera component 10 from complete disengagement from the accommodation chamber 30 when the elastic force of the elastic component 202 is excessively large. Thus, this helps to prevent the camera component 10 from failing to retract into the accommodation chamber 30 and thereby protect it against damage after complete disengagement.

Exemplarily, as shown in FIG. 4 and FIG. 5, the portion, close to the opening 301, of the side wall of the first cavity 302 may be in a stepped arrangement. The fixture block 2031 may hold a protruding portion of the stepped side wall after the camera component 10 stretches out of the accommodation chamber 30.

That is, the recessed portion of the stepped side wall may form a limiting groove configured to limit the camera component 10. The fixture block 2031 could be held by the limiting groove after the camera component 10 stretches out of the accommodation chamber 30, such that the camera component 10 could not continue stretching out. As the camera module 102 of the camera component 10 has stretched out of the accommodation chamber, the camera component could be used to take a photograph as normal.

In another implementation form, to prevent the camera component 10 from complete disengagement from the accommodation chamber 30, the elastic component 202 with an appropriate length may be selected. For example, the length of the elastic component 202 in a natural status (the elastic component 202 is neither in a stretching status nor in a retracting status) is smaller than a depth of the first chamber 302 of the accommodation chamber 30.

Figure 6:
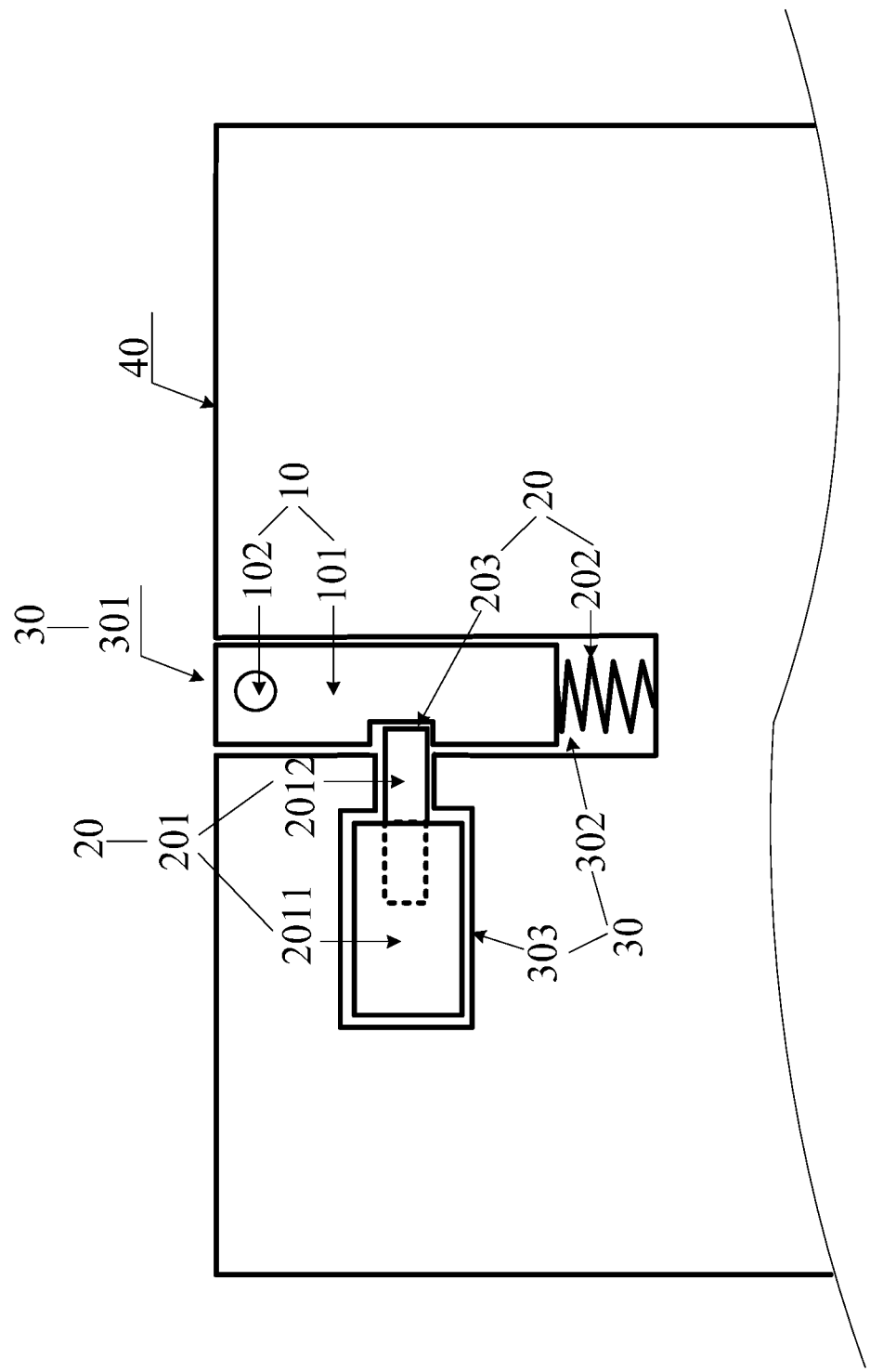
FIG. 6 illustrates a structural schematic view of a terminal according to another embodiment of the present disclosure.

In a second optional implementation form, as shown in FIG. 6, which is a structural schematic view of a terminal according to another embodiment of the present disclosure, the holding component 203 may be a groove located in the side, close to the switch valve component 201, of the camera fixing part 101. The valve core 2012 in the switch valve component 201 may be held by the groove.

Figure 7:
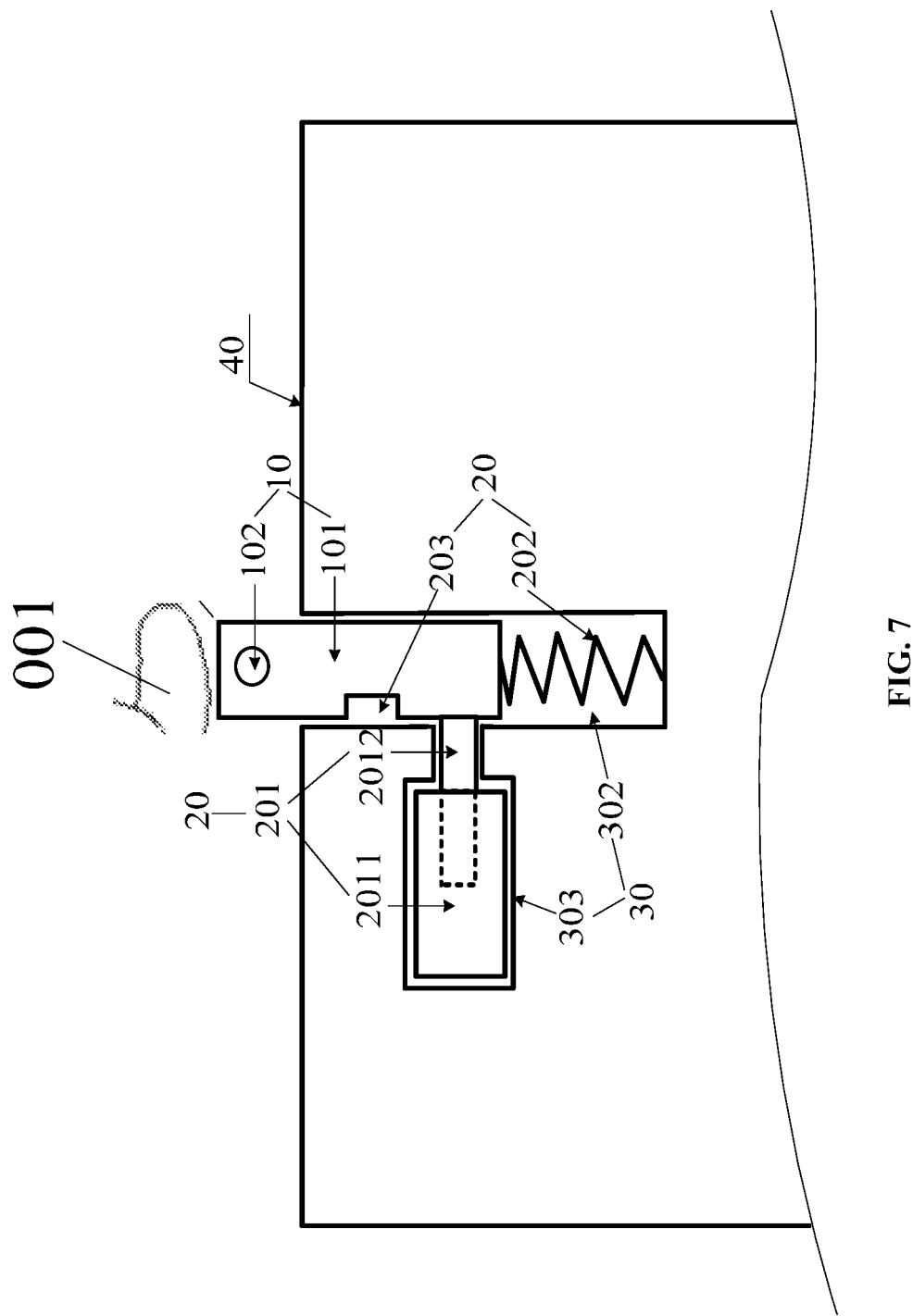
FIG. 7 is an effect view showing that the camera component in the terminal illustrated by FIG. 6 stretches out of the accommodation chamber.

FIG. 7 is an effect view showing that the camera component of the terminal illustrated by FIG. 6 stretches out of the accommodation chamber. As shown in FIG. 7, the valve core 2012 could stretch out of the valve body 2011 under the action of the elastic force of the elastic element, after the camera component 10 stretches out of the accommodation chamber 30. At this time, the end, close to the camera component 10, of the valve core 2012 abuts against the camera fixing part 101. When the user presses the camera component 10 with the finger 001, the camera component 10 could move in the stretching direction of the elastic component 202 and the groove gradually approaches the valve core 2012. When the groove moves to the location of the valve core 2012, the valve core 2012 is held by the groove under the action of the elastic force of the elastic element. Then, the camera component 10 could be limited to be within the accommodation chamber 30.

Optionally, as shown in FIGS. 2, 4, 5, 6 and 7, the elastic component 202 may include at least one second spring. The above figures merely exemplarily illustrate one second spring. One end of each second spring is fixedly connected to the camera component 10, and the other end thereof is connected to the bottom of the accommodation chamber 30. Exemplarily, one end of each second spring is fixedly connected to the camera fixing part 101 of the camera component 10.

In the embodiment of the present disclosure, when the elastic component 202 includes a plurality of second springs, these second springs may be located in parallel. That is, stretching directions of these second springs are parallel and the same as that of the camera component 10. At this time, by connecting the plurality of second springs to the camera component 10, the stability of the camera component 10 during movement is effectively improved.

The structure of the switch valve component is illustrated by combining the connection mode between the valve body and the valve core in the above-mentioned second implementation form. Exemplarily, the switch valve component may be a mechanical valve, a solenoid valve or a combination of a mechanical valve and a solenoid valve. The embodiments of the present disclosure take the following three implementation forms as examples for schematic explanation.

Figure 8:
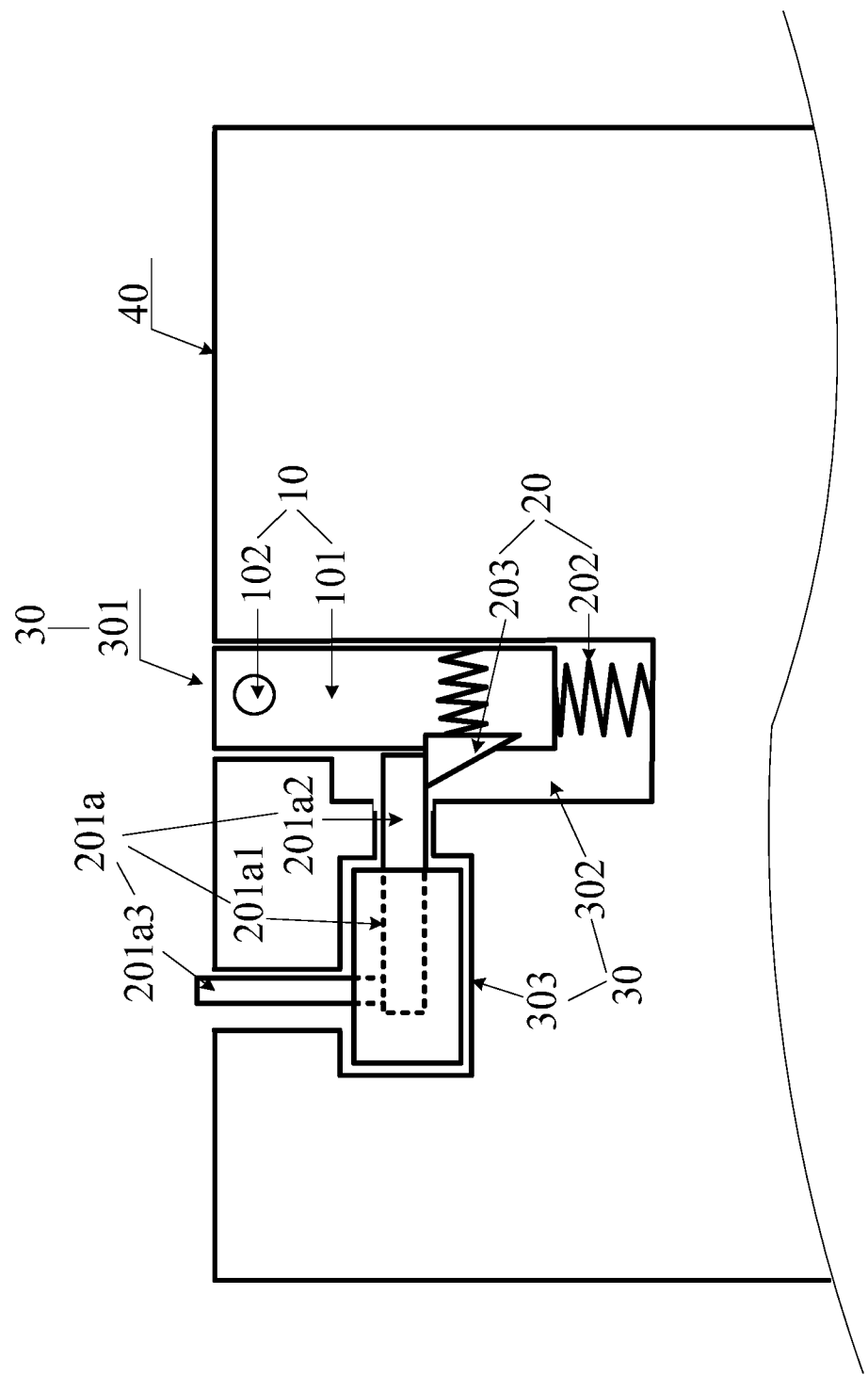
FIG. 8 is a structural schematic view of another terminal according to another embodiment of the present disclosure.

In a first implementation form, as shown in FIG. 8, which is a structural schematic view of another terminal according to another embodiment of the present disclosure, when the switch valve component is a mechanical valve 201a, a valve core 201a2 of the mechanical valve 201a is configured to retract into a valve body 201a1 of the mechanical valve 201a under the action of an external force.

The mechanical valve 201a may be manually controlled by a terminal user. Exemplarily, the user may apply an external force, which enables the valve core 201a2 to retract into the valve body 201a1, to the mechanical valve 201a, such that the valve core 201a2 is separated from the holding component 203. The user may also apply an external force, which enables the valve core 201a2 to stretch out of the valve body 201a1, to the mechanical valve 201a, such that the valve core 201a2 may be held by the holding component 203.

For example, a guide hole may be further provided at the side wall 40 of the terminal. The mechanical valve 201a may further include a connecting piece 201a3. One end of the connecting piece 201a3 passes through the guide hole to be located on the outer side of the side wall 40 of the terminal, and the other end is connected to the valve core 201a2. The user may apply an external force, parallel to a stretching direction of the valve core 201a2, to one end of the connecting piece 201a3, such that the valve core 201a2 retracts into or stretches out of the valve body 201a1.

In another optional implementation form, an elastic element (not shown in FIG. 8) may be further located at the end, in contact with the valve body 201a1, of the valve core 201a2. The valve core 201a2 may automatically restore the status of stretching out of the valve body 201a1 so long as the user stops applying the external force, which enables the valve core 201a2 to retract into the valve body 201a1, to the mechanical valve 201a. That is, the valve core 201a2 could automatically restore the status of stretching out of the valve body 201a1 when the mechanical valve 201a is not subject to an external force. Exemplarily, with respect to the structure as shown in FIG. 8, the elastic element could drive the valve core 201a2 to stretch out of the valve body 201a1 when the user does not apply an external force to the end of the connecting rod 201a3.

Since the mechanical valve 201a needs to be manually controlled by the user and would not be controlled by software, when the software that controls the camera module 102 of the camera component 10 to start gets infected by virus, the mechanical valve 201a may still apply a pressure to the elastic component 202 through the valve core 201a2, so as to limit the camera component 10 to be within the accommodation chamber 30, preventing stretching and retracting of the camera component 10 from being illegally controlled by the software and further improving the security of a camera.

Figure 9:
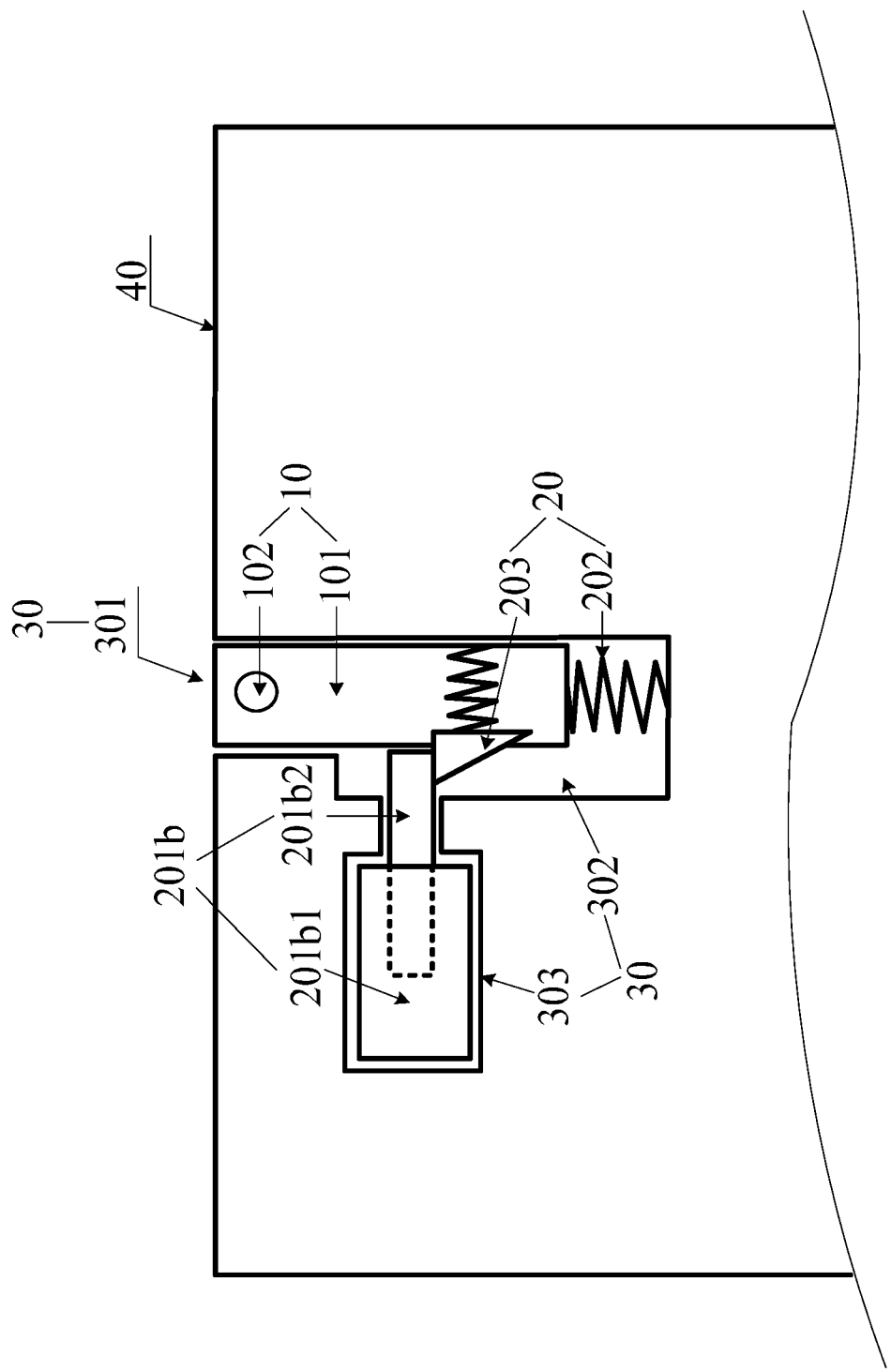
FIG. 9 is a structural schematic view of yet another terminal according to yet another embodiment of the present disclosure.

In a second implementation form, as shown in FIG. 9, which is a structural schematic view of yet another terminal according to another embodiment of the present disclosure, when the switch valve component is a solenoid valve 201b, a valve core 201b2 of the solenoid valve 201b is configured to retract into a valve body 201b1 of the solenoid valve 201b when a solenoid valve opening signal is received.

Exemplarily, when the solenoid valve 201b receives the solenoid valve opening signal, the valve core 201b2 retracts into the valve body 201b1, such that the valve core 201b2 is separated from the holding component 203. In the embodiment of the present disclosure, the stretching status of the valve core 201b2 may be controlled by setting an effective duration of the solenoid valve opening signal. That is, within the duration of the solenoid valve opening signal, the valve core 201b2 retracts into the valve body 201b1, otherwise, the valve core 201b2 stretches out of the valve body 201b1. In another optional implementation form, the valve core 201b2 may be controlled to stretch out of the valve body 201b1 through a solenoid valve closing signal. That is, the valve core 201b2 of the solenoid valve 201b is further configured to stretch out of the valve body 201b1 of the solenoid valve 201b when a solenoid valve closing signal is received.

The solenoid valve 201b may control the camera component 10 to stretch out of or retract into the accommodation chamber 30, rather than controlling the start/stop of the camera module 102 of the camera component 10. That is, functions of controlling the camera component to stretch out and controlling the camera component 10 to film are mutually independent. Thus, when the software that controls the camera module 102 of the camera component 10 to start gets infected by virus, the solenoid valve 201b may still apply a pressure to the elastic component 202 through the valve core 201b2, so as to limit the camera component 10 to be within the accommodation chamber 30. In this way, even if the camera module 102 is controlled to start, the valve core 201b2 of the solenoid valve 201b could still limit the camera component 10 to be within the accommodation chamber 30, and the camera module 102 could not take a photograph. This could prevent camera component 10 from being illegally controlled by the software and further improve the security of the camera module 212.

Further, the terminal may include an identity recognition module and a control module. The solenoid valve 201b, the control module and the identity recognition module may be electrically connected in sequence. The identity recognition module is configured to verify acquired identity information and to input a success signal to the control module after the identity information is authenticated. The control module is configured to input a solenoid valve opening signal to the solenoid valve 201b when receiving the success signal.

The identity recognition module may perform the identity recognition through at least one identity recognition mode that does not require a camera, such as fingerprint recognition, password recognition, vein recognition, voice recognition, etc. The identity recognition module may comprise at least one of a fingerprint recognition module, a password recognition module, a vein recognition module and a voice recognition module.

Taking fingerprint recognition as an example, the identity recognition module may be a fingerprint recognition module. The terminal user may set and save his/her own fingerprint image in the terminal in advance. After that, a function of starting the solenoid valve 201b by a fingerprint may be opened. When needing to use the camera to take a photograph, the user may press a finger in a fingerprint recognition area of the terminal to input a fingerprint image to the fingerprint recognition module. After acquiring the fingerprint image, the fingerprint recognition module may compare it with the saved fingerprint image for a verification. When being determined to be in consistent with the saved fingerprint image, the acquired fingerprint image is authenticated. At this time, the fingerprint recognition module may input a success signal to the control module. Upon receiving the success signal sent by the fingerprint recognition module, the control module may input a solenoid valve opening signal to the solenoid valve 201b.

By adopting an identity validation process to open the solenoid valve 201b, an identification mechanism is introduced in the process of allowing the camera component 10 to stretch out of the accommodation chamber 30. Therefore, only users who are authenticated could start the camera for taking a photograph, and users who are unverified could not start the camera. This could prevent the camera from being utilized without the consent of the terminal owner, improve the security of the camera, and prevent the camera from being used by the lawbreakers who have an access to the terminal.

Figure 10:
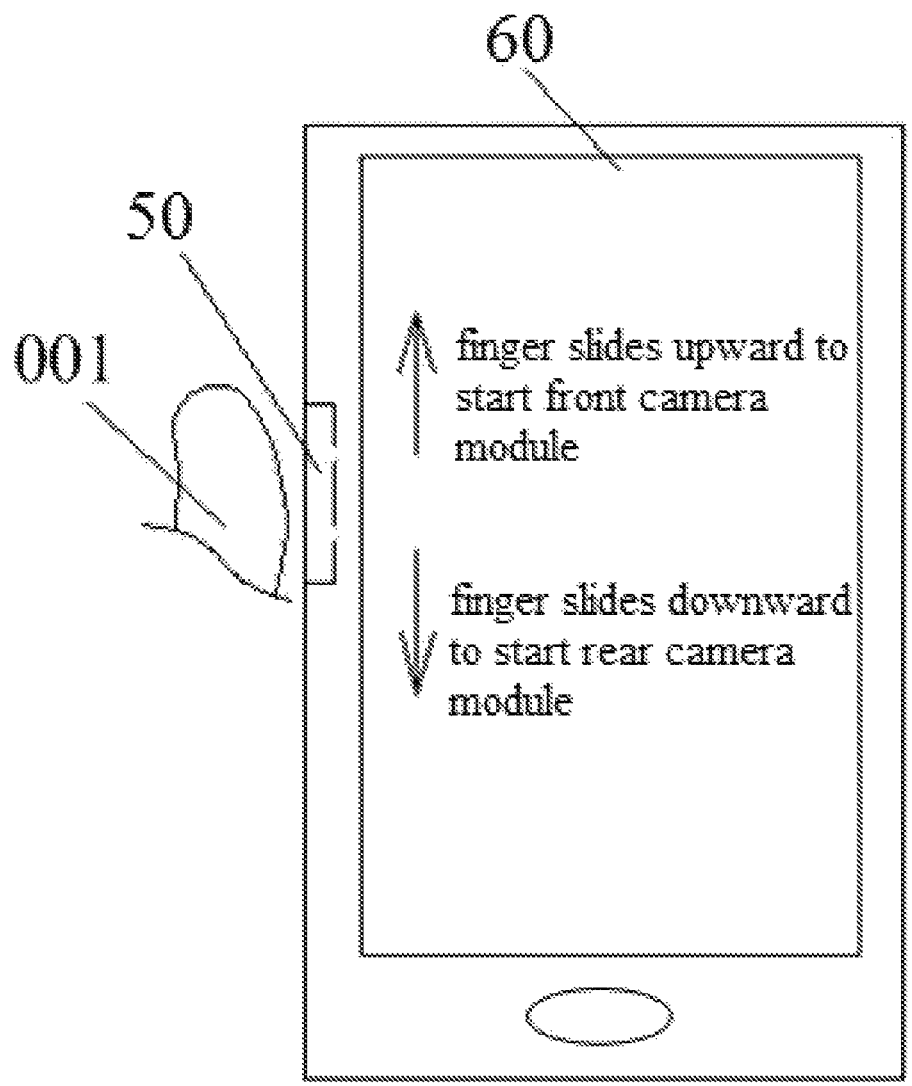
FIG. 10 is a schematic view of a prompt interface for choosing a camera according to an embodiment of the present disclosure.

Moreover, since the camera component 10 may include a front camera module and a rear camera module, after the fingerprint image is authenticated by the fingerprint recognition module, the terminal may display a prompt interface for choosing camera modules. As shown in FIG. 10, which shows a schematic view of a prompt interface for choosing a camera according to an embodiment of the present disclosure, when a user presses the fingerprint recognition area with a finger 001, the fingerprint recognition module 50 may acquire a fingerprint image and then verify it. After the fingerprint image is authenticated, the terminal may display the prompt interface 60 for choosing camera modules on its display screen.

In an implementation form, the prompt interface 60 may display prompt messages of "sliding upward to start front camera module" and "sliding downward to start rear camera module", such that the user may choose to start either front or rear camera module by sliding the finger 001 toward different direction.

In another implementation form, after the fingerprint image is authenticated by the fingerprint recognition module 50, one of the camera modules may be started by default. The user may switch the camera modules by means of a camera switching icon or a preset switching operation. The present disclosure is not limited to this.

It should be noted that, the identity recognition module and the control module may be integrated on a mainboard or other existed modules of the terminal.

Figure 11:
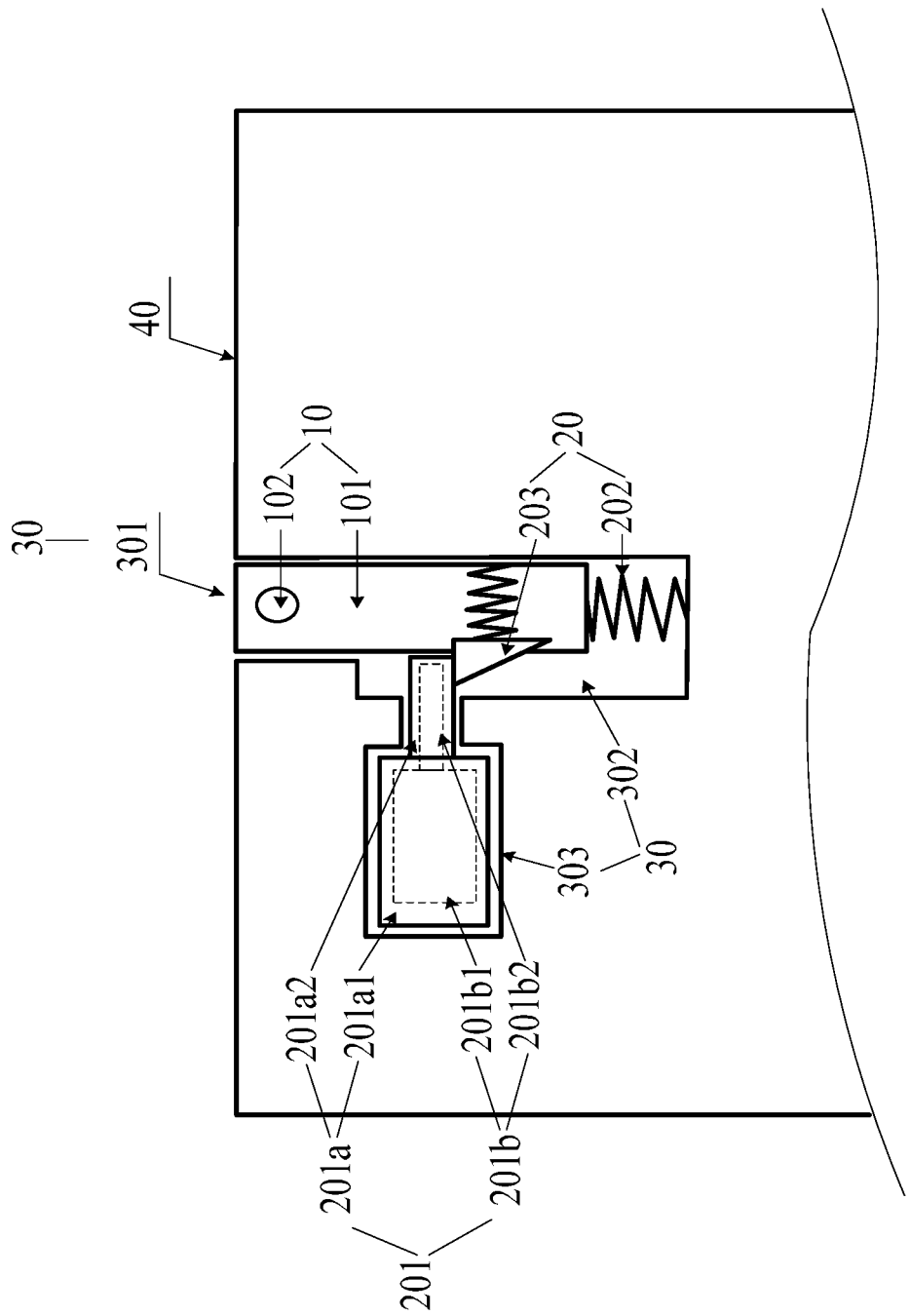
FIG. 11 is a structural schematic view of yet another terminal according to another embodiment of the present disclosure.

In a third implementation form, as shown in FIG. 11, which is a structural schematic view of yet another terminal according to another embodiment of the present disclosure, in addition to a mechanical valve 201a, the switch valve component 201 may further include a solenoid valve 201b. The solenoid valve 201b and the mechanical valve 201a may be sleeve connected. That is, valve cores of the two valves may be sleeve connected, and valve bodies thereof may also be sleeve connected. A control portion (for example, the connecting piece 201a3 in FIG. 8) of the valve core 201a2 of the mechanical valve 201a may be exposed from the terminal body so as to allow the user to perform manual control conveniently. When designing the sleeve connection manner of the solenoid valve 201b and the mechanical valve 201a, it's necessary that the retractions of the respective valve cores would not influence each other. By sleeve connecting the solenoid valve 201b and the mechanical valve 201a, the size of switch valve component 22 could be reduced so as to facilitate the arrangement or addition of other terminal devices.

The mechanical valve 201a and the solenoid valve 201b may also be located in parallel. That is, stretching directions of the valve core 201a2 of the mechanical 201a and the valve core 201b2 of the solenoid valve 201b are parallel to each other. When the switch valve component 201 needs to be separated from the holding component 203, both valve cores need to retract into their respective valve bodies.

It should be noted that, in the practical arrangement, the mechanical valve 201a may be located as unparallel to the solenoid valve 201b, provided that both valve cores could hold the holding component 203 when stretching out.

Figure 12:
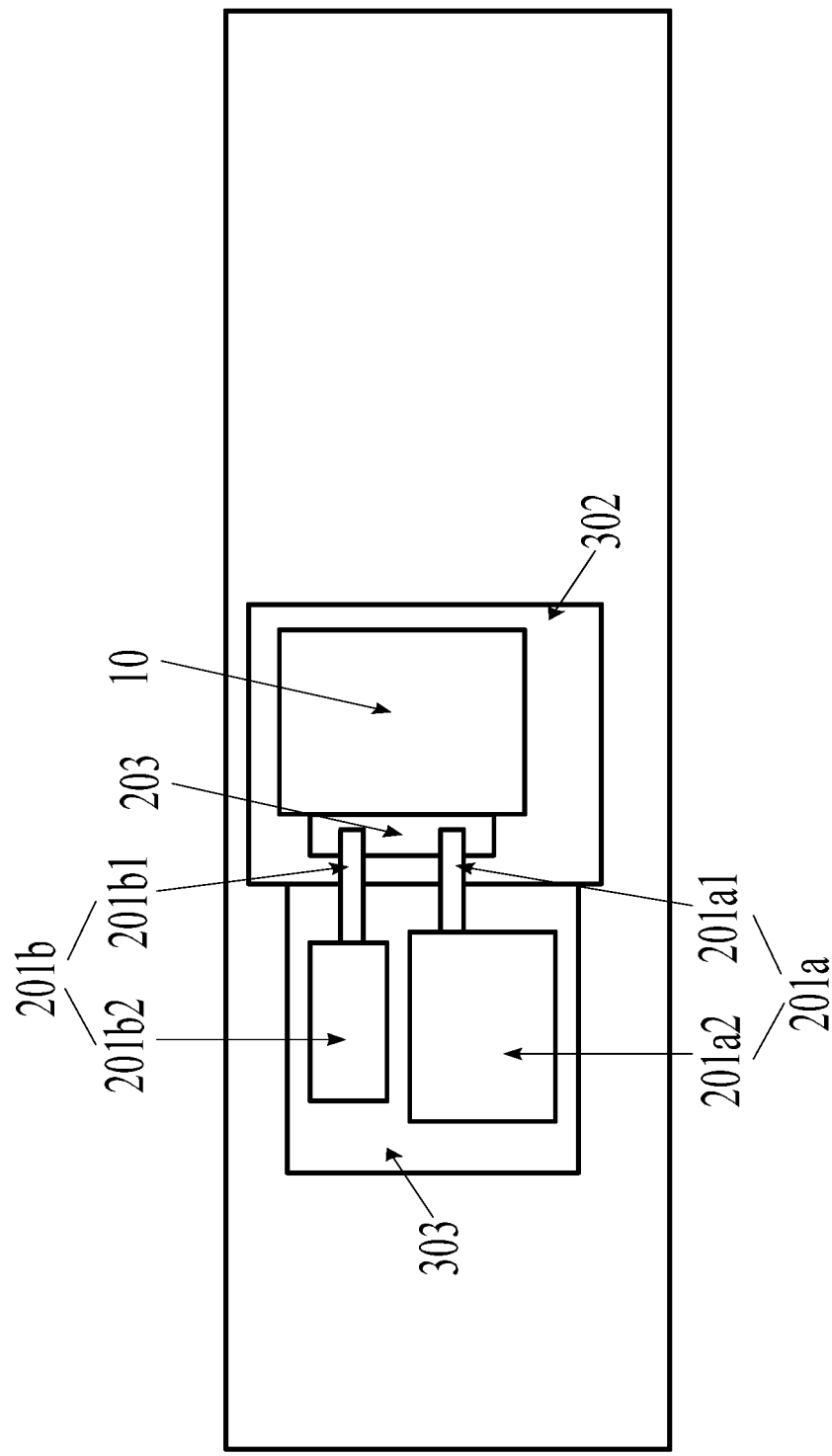
FIG. 12 is a top view of yet another terminal according to yet another embodiment of the present disclosure, Legends for the structure elements identified by numeral numbers in the drawings are as follows.

Moreover, the mechanical valve 201a and the solenoid valve 201b may also be located independently. For example, FIG. 12 is a top view of yet another terminal according to another embodiment of the present disclosure, showing that the mechanical valve 201a and the solenoid valve 201b are located independently. The stretching directions of the valve core 201a2 of the mechanical valve 201a and the valve core 201b2 of the solenoid valve 201b may be parallel to each other.

In the embodiment of the present disclosure, the accommodation chamber 30 may be provided by a display screen, a rear cover and the like of the terminal. Exemplarily, the accommodation chamber 30 may be located between the display screen and the rear cover. Usually, the rear cover may include a bottom cover and a side wall surrounding the periphery of the bottom cover. The display screen may be embedded into the rear cover. The opening 301 of the accommodation chamber 30 may be located at a side wall of the rear cover. The camera component may be located in the accommodation chamber. When not needed, the camera component may retract into the accommodation chamber, which may prevent the camera component from being scratched by an external object.

In summary, according to the terminal provided by the embodiment of the present disclosure, when held by the holding component, the valve core in the switch valve component could limit the camera component to be within the accommodation chamber of the terminal. When camera control software such as a camera application is infected by virus, the camera component would not stretch out from the opening of the accommodation chamber even upon being controlled to open. Accordingly, the camera component could avoid being secretly filmed by lawbreakers and prevent user's privacy from being exposed. When the camera component is required for taking a photograph, the valve core of the switch valve component could be controlled to be separated from the holding component, such that the pressure applied to the elastic component by the valve core would be removed, the elastic component may drive the camera component to stretch out from the opening of the accommodation chamber, and then the camera component could be used as normal to take a photograph.

The terminals provided in the present disclosure have been described in detail as above. The principles and embodiments of the present disclosure have been illustrated by using specific examples. The descriptions of the above examples are merely used to help understand the methods and core concepts of the present disclosure. Meanwhile, persons of ordinary skill in the art can make variations to the specific embodiments and application scope thereof based on the concepts of the present disclosure. In conclusion, the contents of the specifications shall not be construed as limiting the present disclosure.

The singular form "a/an" and "one" herein are to be construed to include the plural form, unless otherwise clearly indicated in the context. In addition, the terms "comprise" and/or "include" used herein define the presence of a characteristic, integer, step, operation, unit and/or means as defined, but are not intended to rule out the presence or addition of one or more other characteristics, integers, steps, operations, units, means and/or combinations thereof.

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

What is claimed is:

1. A terminal, comprising a camera component and a camera control device, wherein
the terminal has an accommodation chamber therein, an opening of the accommodation chamber is located at a side wall of the terminal, and both of the camera component and the camera control device are located in the accommodation chamber;

the camera control device comprises a switch valve component, an elastic component and a holding component;

the elastic component is connected to the camera component and located on the side, away from the opening of the accommodation chamber, of the camera component;

the holding component is connected to the camera component and configured to hold the switch valve component; and the camera component is located in the accommodation chamber when the switch valve component is held by the holding component, and the elastic component drives the camera component to stretch out from the opening of the accommodation chamber when the switch valve component is separated from the holding component, wherein the holding component comprises a fixture block and at least one first spring, and stretching directions of each first spring and the elastic component intersect; and one end of each first spring is connected to the camera component, the other end thereof is connected to the fixture block, and an end face close to the opening of the accommodation chamber, of the fixture block is configured to hold the valve core.

2. The terminal according to claim 1, wherein
the switch valve component comprises a valve body and a valve core movably connected to the valve body; and
the holding component is configured to hold the valve core.

3. The terminal according to claim 2, wherein
the valve core is located in the valve body and is capable of stretching out of and retracting into the valve body, and stretching directions of the valve core and the elastic component intersect;
the valve core is held by the holding component when stretching out of the valve body, applying a pressure to the elastic component along the stretching direction of the elastic component, such that the camera component is located in the accommodation chamber; and
the valve core is separated from the holding component when retracting into the valve body, and the elastic component drives the camera component to stretch out of the accommodation chamber.

4. The terminal according to claim 3, wherein
the valve core is further configured, after the elastic component drives the camera component to stretch out of the accommodation chamber and stops driving the camera component to move, to stretch out of the valve body.

5. The terminal according to claim 4, wherein
the switch valve component is a mechanical valve of which a valve core is configured to retract into a valve body of the mechanical valve under the action of an external force.

6. The terminal according to claim 3, wherein
the switch valve component is a solenoid valve of which a valve core is configured to retract into a valve body of the solenoid valve when a solenoid valve opening signal is received.

7. The terminal according to claim 6, further comprising an identity recognition module and a control module, wherein
the solenoid valve, the control module and the identity recognition module are electrically connected in sequence;

the identity recognition module is configured to verify acquired identity information and to input a success signal to the control module when the identity information is authenticated; and
the control module is configured to input the solenoid valve opening signal to the solenoid valve when receiving the success signal.

8. The terminal according to claim 3, wherein
the switch valve component comprises a mechanical valve and a solenoid valve, valve cores of the mechanical valve and the solenoid valve are sleeve connected, and valve bodies of the mechanical valve and the solenoid valve are also sleeve connected.

9. The terminal according to claim 3, wherein
the stretching direction of the valve core is perpendicular to that of the elastic component.

10. The terminal according to claim 1, wherein
a face, away from the at least one first spring, of the fixture block is a slope, and a thickness of the fixture block in the stretching direction of the at least one first spring is gradually reduced along a direction away from the opening of the accommodation chamber.

11. The terminal according to claim 10, wherein
the fixture block has a triangular longitudinal section that is parallel to the stretching directions of the elastic component and the at least one first spring.

12. The terminal according to claim 1, wherein
the stretching direction of each first spring is perpendicular to that of the elastic component.

13. The terminal according to claim 1, wherein
one end of each first spring is embedded into a cavity of the camera component.

14. The terminal according to claim 1, wherein
a length of the holding component is greater than a width of the opening of the accommodation chamber, and a length direction of the holding component and a width direction of the opening are parallel to the stretching direction of the first spring.

15. The terminal according to claim 1, wherein
the elastic component comprises at least one second spring; and
one end of each second spring is connected to the camera component, and the other end thereof is connected to the bottom of the accommodation chamber.

16. The terminal according to claim 1, wherein
the accommodation chamber comprises a first chamber and a second chamber communicated with the first chamber, an opening of the second chamber is located at a side wall of the first chamber, and an opening of the first chamber is the opening of the accommodation chamber;
both of the elastic component and the holding component are located in the first chamber, and the switch valve component is located in the second chamber; and
the camera component is located in the first chamber when the valve core is held by the holding component, and the elastic component drives the camera component to stretch out from the opening of the first chamber when the valve core is separated from the holding component.

17. The terminal according to claim 16, wherein
a slide rail is located on a side wall of the first chamber, a bulged structure adapted to the slide rail is located on the camera component, and the camera component drives the bulged structure to slide in the slide rail when the camera component stretches and retracts in the accommodation chamber.

18. The terminal according to claim 17, wherein an extending direction of the slide rail is parallel to the stretching direction of the elastic component.

19. The terminal according to claim 1, further comprising a display screen and a rear cover, wherein
the accommodation chamber is located between the display screen and the rear cover, and the opening of the accommodation chamber is located at a side wall of the rear cover.

\* \* \* \* \*